July 25, 1950 — H. BLANCHETTE — 2,516,543
FEEDING AND FORMING MACHINE
Filed March 27, 1947
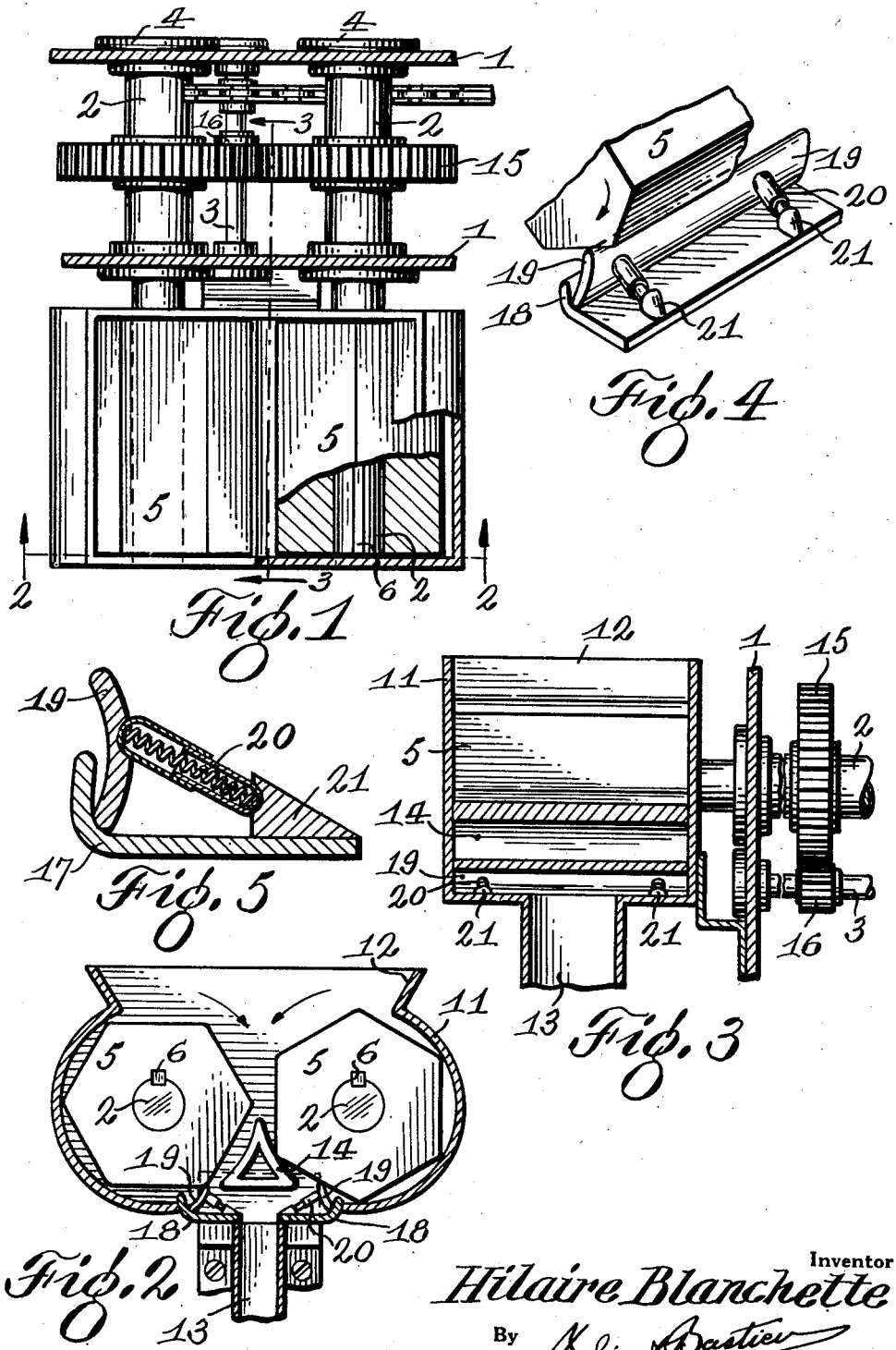
Inventor
Hilaire Blanchette
By
Attorneys Patented July 25, 1950

2,516,543

UNITED STATES PATENT OFFICE 2,516,543

FEEDING AND FORMING MACHINE

Hilaire Blanchette, St. Simon de Drummond, Quebec, Canada

Application March 27, 1947, Serial No. 737,669
In Canada April 12, 1946

3 Claims. (Cl. 18—12)

The present invention pertains to a novel machine for feeding and forming a semi-rigid substance such as butter.

The principal object of the invention is to provide a simple mechanism of this character for preparing a quantity of butter to be cut into blocks before being wrapped.

In the accomplishment of this object, the machine comprises a hopper in which is journalled a pair of polygonal rollers closely adjacent to each other on parallel axes and provided with suitable mechanism for turning them respectively in opposite directions. The butter is charged into the top of the hopper and is forced by the rollers into a funnel communicating with the bottom of the hopper at an area between the rollers. The rolls are somewhat displaced angularly from each other to promote the feeding of material. Directly above the upper end of the funnel is mounted a substantially triangular separator block which maintains the material on the surfaces of the rolls on its way to the funnel. The material is removed from the rolls by yieldingly mounted wiper blades.

The funnel is preferably of rectangular cross sectional configuration to form an elongated block of material. The rate of removal of the material from the funnel is such that the block will remain firmly packed. At the discharge end, the material is cut into smaller blocks of suitable size and then wrapped, as in the case of butter. It will be understood, however, that the machine is equally suitable for a similar operation on other semi-rigid materials such as paraffin and heavy greases.

The invention is fully disclosed by way of example in the following description and in the accompanying drawings in which:

Figure 1 is a plan view of the device, partly in section;

Figure 2 is an elevation on the line 2—2 of Figure 1;

Figure 3 is a section on the line 3—3 of Figure 1;

Figure 4 is a detail perspective view of the wiper blade assembly; and

Figure 5 is a cross section of the wiper blade arrangement.

Reference to these views will now be made by use of like characters which are employed to designate corresponding parts throughout.

Numeral 1 designates generally a housing in which are journalled a pair of shafts 2, spaced apart in the same horizontal plane, and a lower shaft 3. The shafts are supported in bearings 4 mounted in the housing 1.

The shafts 2 extend considerably outside of the housing, as may be seen in Figure 1 and are there equipped with hexagonal feed rolls 5 secured by keys 6. It will be seen in Figure 2 that each roll is displaced angularly from the other, about its axis, by substantially one-half the angle subtended by a face of the roll.

The rolls are enclosed in a hopper 11 having an upper opening 12 and communicating at the bottom, between the rolls, with a vertical channel or funnel 13. Directly above the funnel 13, a substantially triangular separator 14 is mounted in the hopper and between the rolls.

The faces of said separator opposed to the rolls, extend for a linear length substantially equal to the distance between two apices of the rolls, each apex being formed by two adjoining faces of said rolls.

Thus, during rotation of the rolls, there will be nearly always one apex of each roll in co-operation with the separator to positively force the material towards the funnel.

The shafts 2 carry gears 15 meshing with one another. One of the gears 15 is driven by a pinion 16 mounted on the shaft 3 which, in turn, is driven by any suitable source of power.

On the upper end of each side of the funnel 13 is mounted a plate 17 extending axially of the rolls and formed with an upwardly curved lip 18 at its outer edge. Within the lip is mounted one edge of a wiper blade 19 having its opposite edge engaging the adjacent roll 5. Each wiper blade is held yieldingly against the corresponding roll by a pair of coil springs 20 seated on the plate 17 by means of a suitable retaining block 21.

It is now apparent that the rolls 5 rotate respectively in opposite directions as shown by the arrows in Figure 2. The butter or other material is deposited in the mouth 12 in a semi-solid condition. It is moved by the rollers 5 against the separator 14 and divided by the latter into two relatively thin strips. The material is scraped from the rollers 5 by the wiper blades 19 and transmitted to the funnel 13. The delivery from the funnel is at such a rate as to permit the latter to fill with material and thus form a continuously moving elongated block. At the discharge end of the funnel, the column of material is cut into suitable lengths and wrapped by a mechanism not illustrated herein.

Although a specific embodiment of the invention has been illustrated and described, it will be understood that various alterations in the details of construction may be made without departing from the scope of the invention as indicated by the appended claims.

Having thus described my invention, I claim:

1. A feeding and forming machine comprising a hopper, a pair of polygonal rolls journalled therein on parallel axes, a funnel extending from the bottom of said hopper at an area between said rolls, and spring-pressed wiper blades engaging said rolls adjacent to said funnel.

2. A feeding and forming machine comprising a hopper, a pair of polygonal rolls journalled therein on parallel axes, a funnel extending from the bottom of said hopper at an area between said rolls, a separator block in said hopper between said rolls and directly over said funnel, and spring-pressed wiper blades engaging said rolls adjacent to said funnel.

3. A feeding and forming machine comprising a hopper, a pair of polygonal rolls journalled therein on parallel axes, a funnel extending from the bottom of said hopper at an area between said rolls, one of said rolls being angularly displaced from the other about one-half the angle subtended by a face of the roll, a substantially triangular separator block in said hopper between said rolls and directly over said funnel, and spring-pressed wiper blades engaging said rolls adjacent to said funnel.

HILAIRE BLANCHETTE.

REFERENCES CITED

The following references are of record in the file of this patent:

UNITED STATES PATENTS

| Number | Name | Date |
| --- | --- | --- |
| 160,293 | Aldrich | Mar. 2, 1875 |
| 1,561,612 | Loichot | Nov. 17, 1925 |
| 1,752,471 | Trebes | Apr. 1, 1930 |
| 2,351,706 | Robinson | June 20, 1944 |
| 2,434,707 | Marshall | Jan. 20, 1948 |